Sept. 7, 1965 L. J. HANCHETT, JR 3,204,950

HALTED OBJECT DETECTOR

Filed April 9, 1963 5 Sheets-Sheet 1

INVENTOR.
LELAND J. HANCHETT, JR
BY
Lewis P. Elbinger
ATTORNEY

Sept. 7, 1965 L. J. HANCHETT, JR 3,204,950

HALTED OBJECT DETECTOR

Filed April 9, 1963 5 Sheets-Sheet 3

Sept. 7, 1965 L. J. HANCHETT, JR 3,204,950

HALTED OBJECT DETECTOR

Filed April 9, 1963 5 Sheets-Sheet 4

Sept. 7, 1965 L. J. HANCHETT, JR 3,204,950

HALTED OBJECT DETECTOR

Filed April 9, 1963 5 Sheets-Sheet 5

United States Patent Office 3,204,950
Patented Sept. 7, 1965

3,204,950
HALTED OBJECT DETECTOR

Leland J. Hanchett, Jr., Phoenix, Ariz., assignor to General Electric Company, a corporation of New York Filed Apr. 9, 1963, Ser. No. 271,625
12 Claims. (Cl. 271—57)

This invention concerns a system for determining that an object moving in a path of travel has ceased to move and more particularly concerns a system for determining that a document such as a sheet of paper being moved in a path of travel in a document handling apparatus has halted in the path of travel.

A transporting system for moving a plurality of documents such as bank drafts past a multiple number of sorting devices is shown, by way of example, in United States Patent Number 3,108,694 "System for Collating Documents in Response to Indicia Appearing Thereon" issued October 29, 1963, by N. R. Crain et al. and assigned to the present assignee. When, for unintentional reasons, any document halts or becomes jammed in its path of travel, the system must be rapidly stopped in order to quickly cease further movement of all other documents in the path of travel, since succeeding documents may be jammed against the halted document and cause serious mutilation of all succeeding documents.

In object transporting systems wherein the speed and number of moving objects is low enough so that a human operator can observe all objects at once, the operator is generally able to rapidly shut off motive power to the transporting system whenever he observes a halted object. However, when the speed at which the objects are being moved, or the number of objects present in the transporting system is too great for reliable rapid response by a human operator, it is usually necessary to incorporate in the system a means for quickly determining either that a moving object is threatening to jam against other objects, or that an object has actually halted in the transporting path. When either of these two conditions are encountered motive power throughout the transporting system must be disconnected as rapidly as possible in order to prevent or minimize damage to the objects.

In a document sorting system of the type shown and described in the aforementioned Crain et al, patent, a feeding device feeds individual documents, at a typical rate of 1200 documents per minute, past a symbol reading device to a transporting apparatus.

The transporting apparatus moves each document past a series of individual sorting devices located at spaced apart points along a transporting path. Each document is destined to be transferred from the transporing path into a sorting compartment associated with one of the sorting devices. At certain instants of time each moving document in the transporting path is located near certain points adjacent the sorting devices. At those instants one or more sorting devices is operated to cause the adjacent document to be transferred from the transporting path to the associated sorting compartment.

In some types of document handling apparatuses the moving documents must be located within a very short range of the above mentioned certain points in the path of travel at the time the sorting devices are operated.

If, when the sorting device is operated, a document is further along (mislocated) in the path of travel greater than permissible, the document may be seriously mutilated and jammed in the transporting path. On the other hand if, when a sorting device is operated a document is further back (mislocated) in the path of travel greater than permissible, the document may fail to be transferred to the associated sorting compartment even though the document is neither halted nor jammed. If the document merely fails to be transferred it will be carried along the entire length of the transporting path and will automatically be deposited in a special receiving compartment.

Documents received in the special receiving compartment may subsequently be manually transferred to the feeding device. Another feeding operation may subsequently cause transfer of the documents to the correct sorting compartment.

Improved sorting devices of the type described in United States Patent 2,867,438 "Paper Stacking Device" by Tatsu Hori and assigned to the present assignee have been developed wherein the probability of mutilation of mislocated documents moving in a transporting path has been considerably reduced. In addition, it has been found that in the Tatsu Hori type sorting device, mislocation of moving documents in the transporting path does not usually seriously affect the document's response to operation of the sorting devices.

Various mislocated document detection systems of the prior art have been devised to detect, at certain instants of time, if any one document moving in a transporting path is not within the permissible location range. The mislocated document detection systems operate on the principle that since there is a space separating normally spaced apart and normally moving documents from each other, there will be spaces at predetermined points in the path of travel at predetermined instants or intervals of time. The instants of time are necessarily predetermined with respect to an instant of time that a document is initially supplied to the transporting apparatus by the feeding device. If a document is mislocated in the path of travel at a certain predetermined instant of time it is generally at a location where space between documents would normally occur at that instant of time.

When a document is detected as being mislocated, motive power is rapidly removed from the transporting apparatus in order that movement of all documents may be quickly ceased. The quick halting of a mislocated document thus negates any chance that it will have succeeding documents jam against it.

An actually halted or jammed document generaly occupies one of the positions mentioned above where a space between documents would normally occur. The mislocated document detection systems can detect actually halted documents at the predetermined instants of time. However, they cannot distinguish between merely mislocated but moving documents and actually halted documents. The present invention is concerned with detecting only actually halted documents.

It has been found desirable, when a document handling apparatus is utilizing the Hori type sorting device, to allow mislocated moving documents to pass on to the special receiving compartment and to allow the other properly spaced apart moving documents to be operated upon by the sorting devices as required. This desirability is founded on the fact that if all documents in the transporting path are halted when motive power is removed from the transporting apparatus, then each halted document must be manually removed from the transporting apparatus and returned to the feeding device for a subsequent trip through the transporting path.

Detection of jammed documents has in the past been also accomplished by providing a series of sensitive microswitches very close to the path of travel of the moving documents. When a document becomes jammed it generally is distorted and pushes physically against a microswitch. The microswitch then completes or breaks an electrical circuit that will disconnect motive power from the transporting apparatus. Due to the sensitivity of microswitches and problems of maintaining proper placement of the microswitches this method of detecting jammed documents has not proved to be effective.

Accordingly, it is the principal object of the present invention to provide for an improved system of detection of objects halted in a path of travel.

Another object of the present invention is to provide an improved system for detection of objects jammed in a path of travel without touching of the objects.

Another object of this invention is to distinguish between threatened hauling of objects and actual halting of objects in a path of travel.

Further objects and advantages of the present invention will become apparent as the description proceeds.

One embodiment of the present invention which achieves the stated objects is realized by providing a series of photo responsive sensors and associated light beam sources positioned alongside of a transporting path through which documents such as thin flexible sheets of paper are being moved.

As a document moves in the path it alternately intercepts each light beam when the document is present adjacent a respective sensor and allows the light beam to illuminate the sensor when the document is absent. Each sensor responds to the interception of the light beam and the illumination by the light beam by furnishing respectively a document presence signal and a document absence signal. A memory, which is responsive during recurring time intervals records or stores only the document absence signal of each sensor any time during the time intervals. At the end of each time interval the memory is interrogated to determine if it has recorded document absence signals from each sensor during the previous time interval. If the memory lacks a recording or storage of one or more document absence signals for all sensors, a halting signal is generated. The halting signal thus generated denotes the fact that during the entire previous time interval the light beam associated with at least one sensor was intercepted by a document adjacent that sensor.

The halting signal is furnished to a suitable means to cause motive power to be removed from the document transporting apparatus in order that movement of all documents in the transporting path may then be ceased and corrective action may be initiated.

If the memory contains a recording of a document absence signal for each sensor at the time the memory is interrogated the memory is merely cleared of the recordings and continues to make a new set of recordings during the next time interval.

The features of novelty that are considered characteristic of this invention are set forth with particularity in the appended claims. The organization and method of operation of the invention may best be understood from the following description when read in connection with the accompanying drawings in which:

Figure 3A:
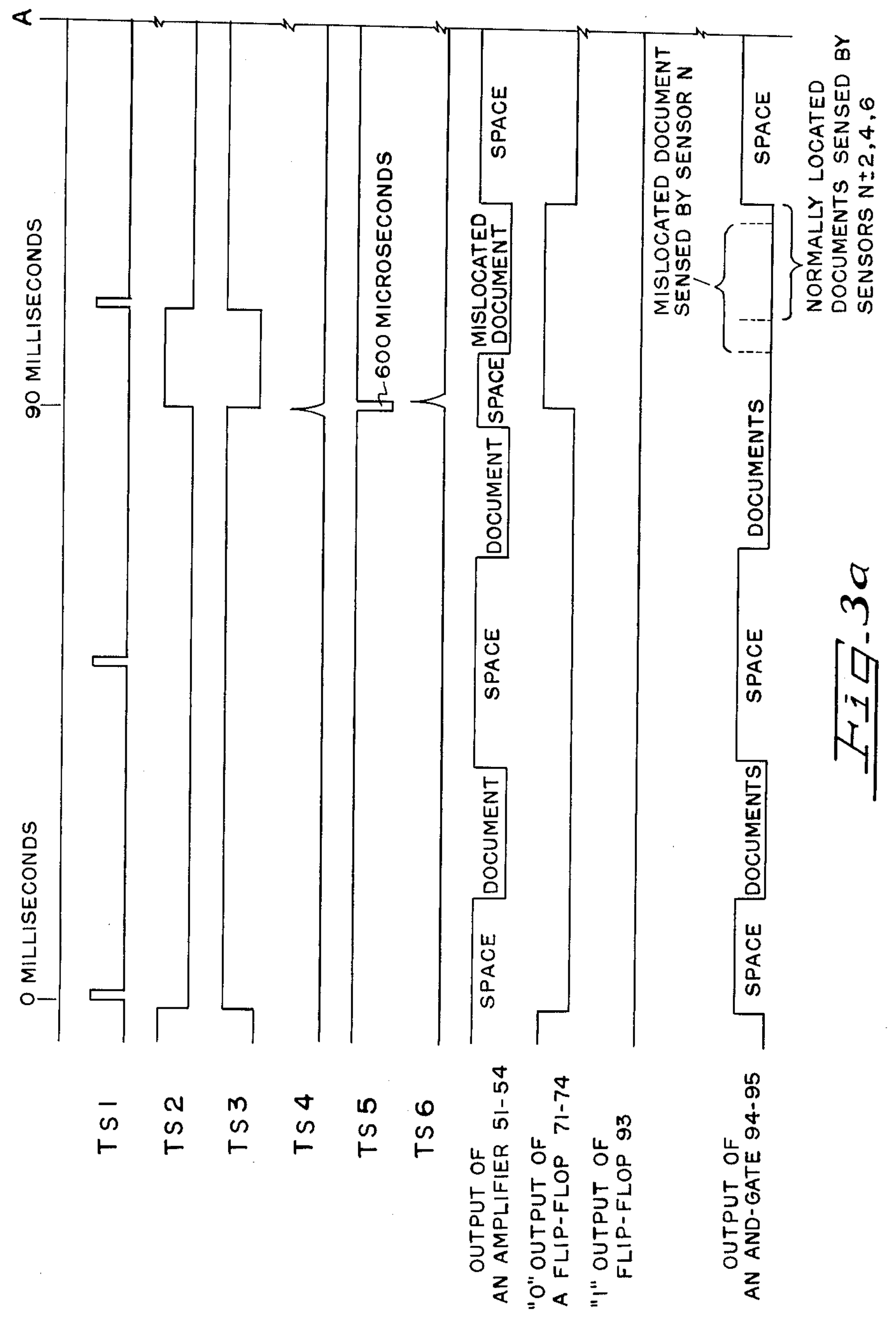
Figure 3B:
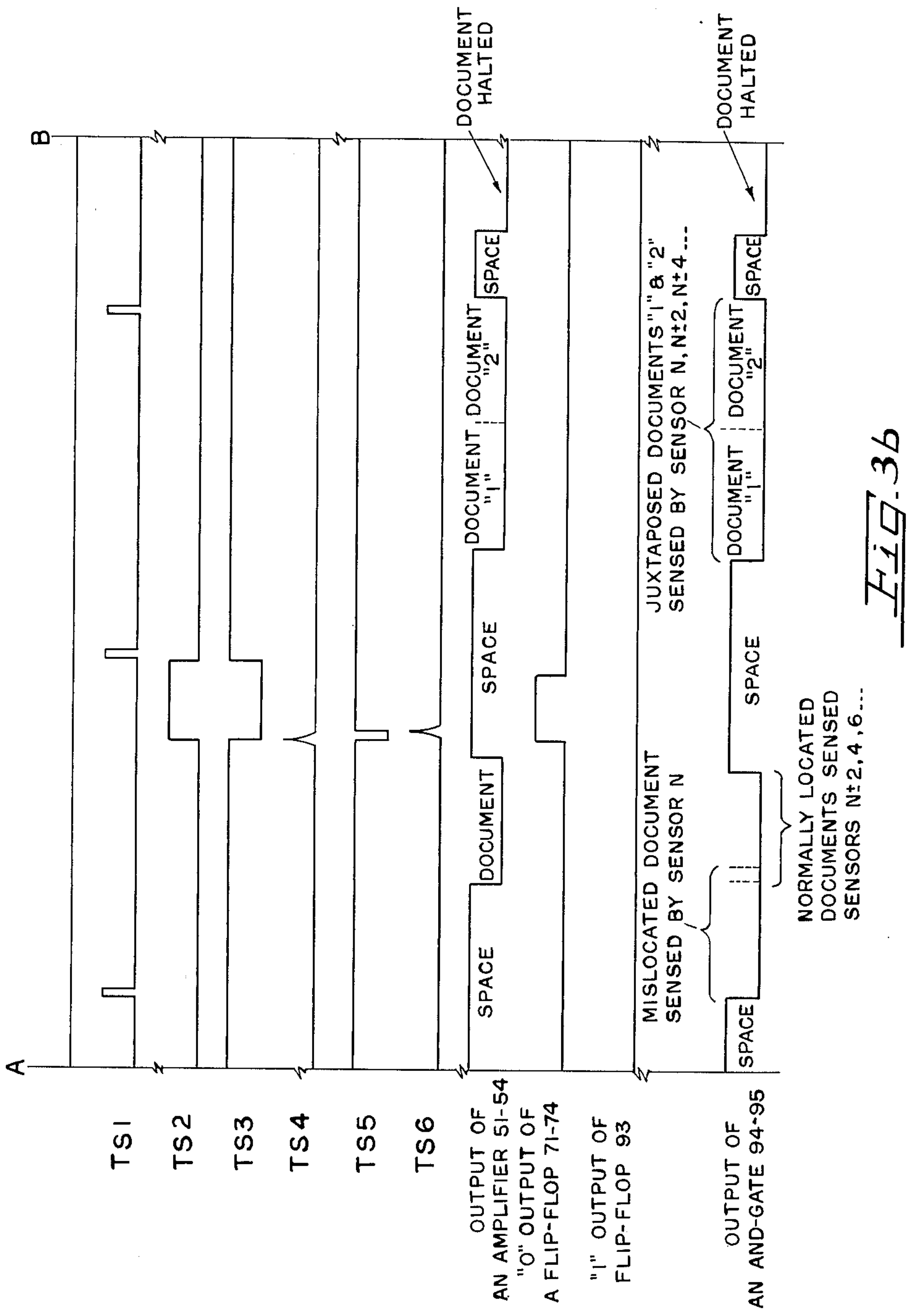
Figure 3C:
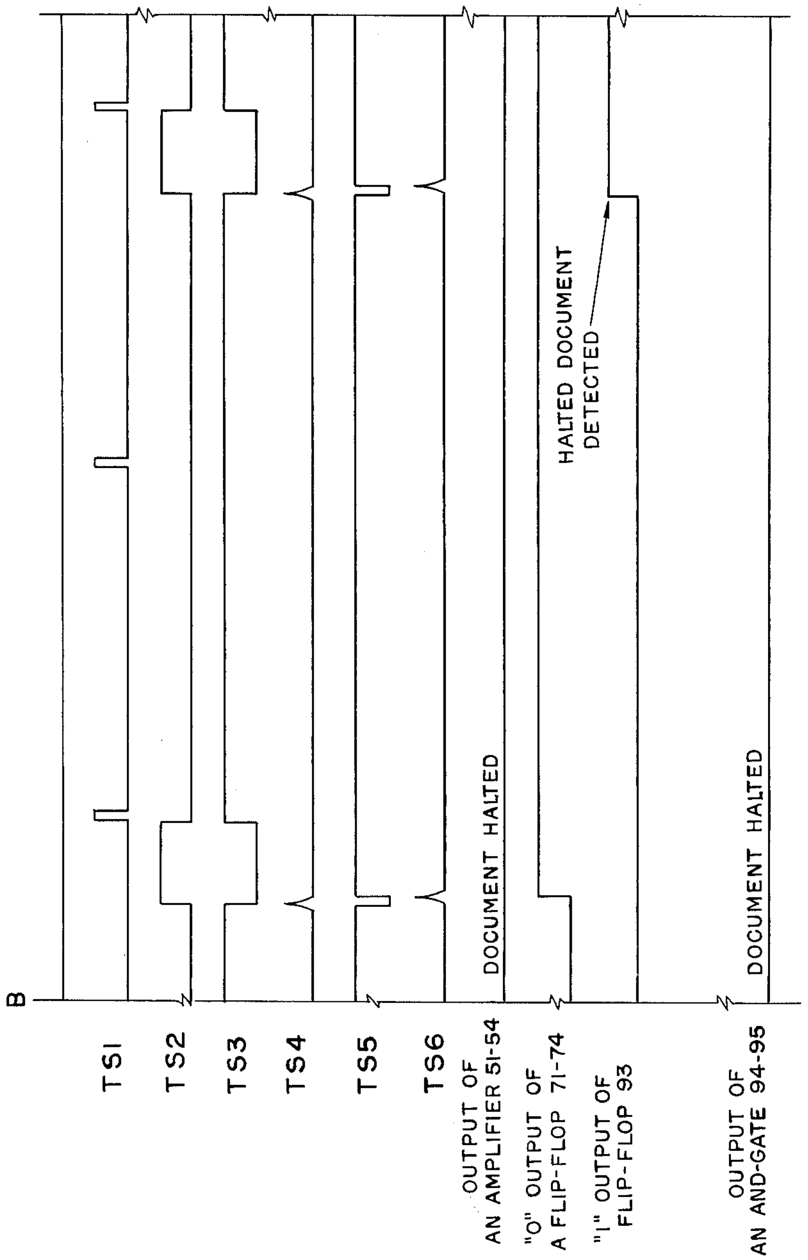

FIGURES 3*a* 3*b* and 3*c* are timing diagrams showing typical electrical signal patterns effected by various elements of the present invention.

*General description*

Figure 1:
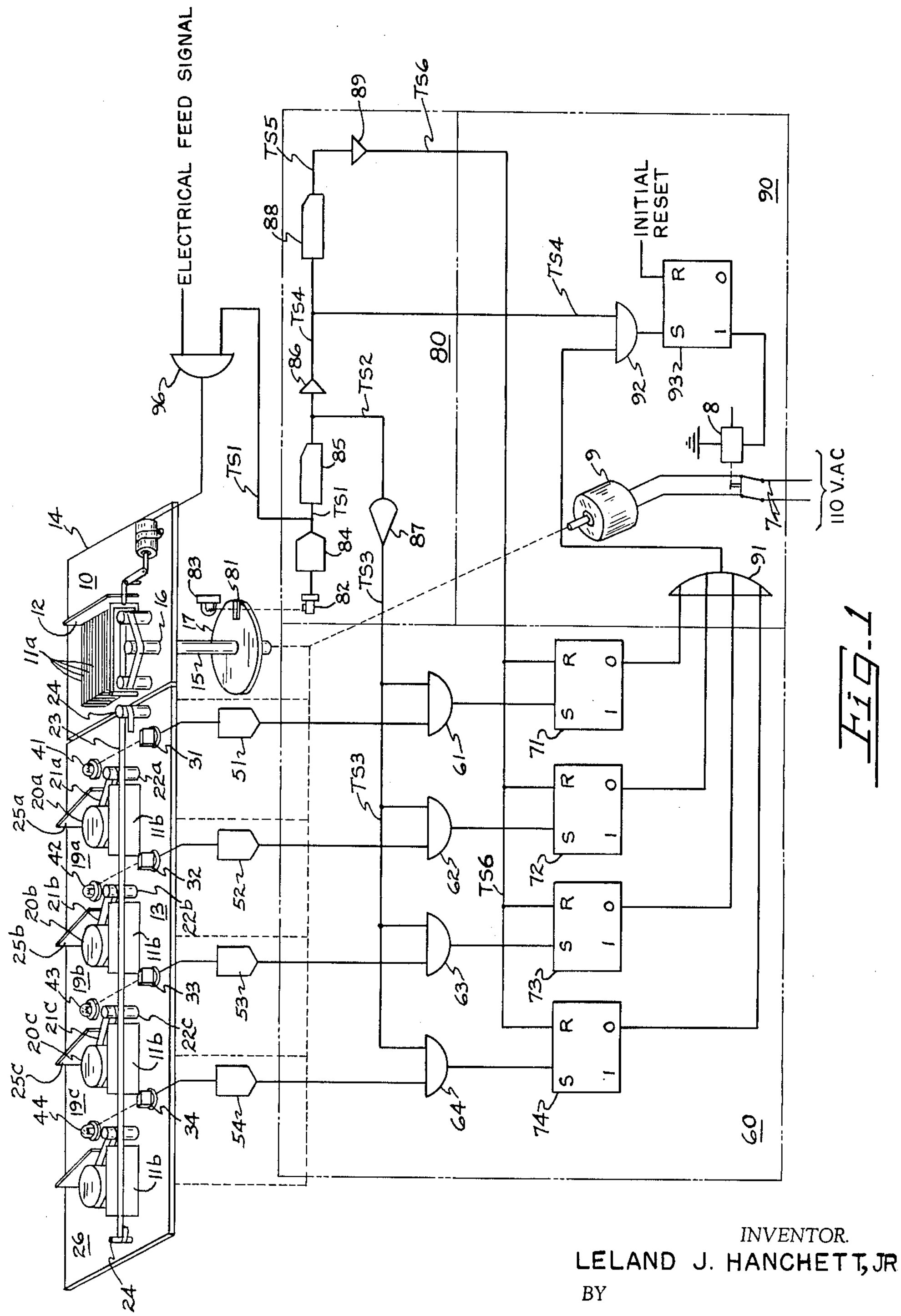
FIGURE 1 is a combined diagrammatic illustration of an environment of the present invention and a logic diagram showing one embodiment of the present invention.

There is shown in FIG. 1 a simplified illustration of a document feeding apparatus 10 whose function is to supply individual documents 11*a* one-by-one and spaced apart from each other from a supply hopper 12 to a document transporting apparatus 13. The feeding apparatus 10 includes a base 14 through which is rotatably supported a drive shaft 15. By means such as an electric motor 9, shown connected to shaft 15 by dotted lines, the shaft 15 is rotated at a constant angular speed in the counterclockwise direction. A pulley 16 attached to the upper end of the shaft 15 provides driving power to the feeding apparatus 10. The documents 11*a* are fed from the supply hopper 12 only at a certain instant of time during a rotation cycle of shaft 15 as long as an electrical feed signal is furnished to the feeding apparatus 10 from an electronic data processor or other suitable feeding control means. The lower end of shaft 15 is provided with a timing wheel 17 which is conveniently used to initiate generation of a set of electrical timing signals as more fully described below in the description of a timing signal generator 80.

The document transporting apparatus 13 functions to move or advance supplied documents 11*b* at a constant speed in a path of travel past three document sorting devices 19*a*, 19*b*, and 19*c* which may be of the type described in the aforementioned Tatsu Hori patent. As many sorting devices as desired may be used. As shown in FIG. 1 each sorting device 19*a*, 19*b*, and 19*c* includes a rotatably supported drum 20*a*, 20*b*, and 20*c*. Endless belts 21*a*, 21*b*, and 21*c* are positioned around respective drums 20*a*, 20*b*, and 20*c* and associated idling pulleys 22*a*, 22*b*, and 22*c*. By suitable motive power driving means (shown as dotted lines connected with motor 9) each of the drums 20*a*, 20*b*, and 20*c* and associated belts 21*a*, 21*b*, and 21*c* are rotated at constant angular speed in the clockwise direction in synchronism with the rotating shaft 15.

An endless belt 23 is suitably supported by means of idling pulley 24 against a portion of each of the belts 21*a*, 21*b*, and 21*c*. Friction between the belts 21*a*, 21*b*, and 21*c* and belt 23 causes belt 23 to be moved at a constant speed in the counterclockwise direction.

As a document 11*a* is supplied from the feeding device 10 it is gripped between the first moving belt 21*a* and belt 23 and transported or moved from right to left past the first sorting device 19*a*. If, as a moving document 11*b* moves adjacent sorting device 19*a*, the device 19*a* is not operated the document 11*b* exits from between the first belt 21*a* and is gripped between the second belt 21*b* and belt 23. If the sorting device 19*a* is operated when a document 11*b* is adjacent the associated drum 20*a* the document will be removed from the path of travel defined by belt 23 and will be transferred into a sorting compartment 25*a* associated with the sorting device 19*a*.

A special receiving compartment 26 is positioned at the extreme left of the transporting apparatus 13 in order to automatically receive any document 11*b* fed by the feeding device 10 and not transferred into any one of the sorting compartments 25*a*, 25*b*, and 25*c*. A document 11*b* moving in the transporting path may fail to be transferred to a sorting compartment 25*a*, 25*b*, and 25*c* for one of two reasons: first, none of the sorting devices 19*a*, 19*b*, and 19*c* were operated when the document was positioned adjacent the associated drums 20*a*, 20*b*, and 20*c*; or second, operation of a sorting device 19*a*, 19*b*, and 19*c* failed to remove the document 11*b* from the transporting path and the document consequently continued moving along the transporting path. The last mentioned reason usually results when a moving document is mislocated in the path of travel when a sorting device 19*a*, 19*b*, and 19*c* is operated.

The present invention is concerned with determining that a document has halted or has become jammed in the path of travel defined by belt 23. When it has been determined that a document has halted in the path of travel, electrical power is removed from the motor 9 in order that further movement of all documents in the transporting path may be quickly ceased. After movement of all documents has been ceased the halted document or jammed document is removed from the path of travel and the reason for the unintentional halting or jamming of the document may be corrected.

Detection of a halted document is accomplished by a series of photo responsive sensors 31–34 such as photo electric cells or photo transistors positioned adjacent the path of travel to detect the presence and absence of documents at spaced apart points along the path of travel. Each sensor 31–34 has associated therewith a respective light source 41–44. Each light source 41–44 is positioned on the side of the path of travel of the document that is opposite its associated sensor 31–34. Each light source 41–44 is continuously energized and causes a beam of light, shown in FIG. 1 as a dotted line, to illuminate its respective sensor 31–34, as long as a document 11*b* does not intercept the beam of light. The sensors 31–34 and associated light sources 41–44 are shown in FIG. 1 as being positioned at regular spaced apart intervals along the path of travel. In the embodiment of the present invention shown in FIG. 1 it is not required that the sensors or light sources be at regular spaced apart points as will become more apparent as the description proceeds.

Each of the sensors 31–34 responds to illumination by its associated light source 41–44 by generating a definite small electrical signal at its output lead. When a light beam is intercepted and thus does not illuminate the associated sensor 31–34 a different electrical signal is furnished on the sensor's output lead.

The output lead from each sensor 31–34 is connected with an input lead of an associated respective sensor amplifier 51–54 for amplifying or converting the electrical signals to a magnitude and polarity that may be more readily utilized by other components of the invention as herein described. There is shown in FIG. 3 a typical wave form or electrical signal pattern available at the output leads of any one of the amplifiers 51–54 as a document 11*b* moves past the amplifier's associated sensor 31–34.

The magnitude and polarity of the signals from the amplifiers 51–54 may be of any value compatible with the requirements of the electrical circuits of the system. For purposes of illustration, the magnitude of the signals are merely designated and described as high level and low level with no reference to absolute magnitude and polarity. The only signal voltage requirement of the electrical circuits of the system is that there be two distinct voltages available.

The time versus voltage signal pattern (FIG. 3) available from the output leads of the amplifiers 51–54 may be interpreted as an image of documents 11*b* moving through the transporting apparatus in the path of travel. As long as a document 11*b* is not present or is absent from adjacent a certain sensor 31–34 and is thus not intercepting the light beam associated with that sensor, the output signal available on the output lead of the associated amplifier 51–54 is high level. As long as a document 11*b* is adjacent or present adjacent a certain sensor 31–34 and is thus intercepting the light beam associated with that sensor, the output signal available on the output lead of the associated amplifier 51–54 is low level.

A memory 60 has been provided to record and store only during recurring time intervals the amplified document absence signals of each sensor 31–34. The memory 60 includes a series of AND-gates 61–64. Each AND-gate 61–64 is provided with two input leads and one output lead. The AND-gates may be of any suitable type to implement the Boolean logic AND function. In the illustrated embodiments of the present invention each AND-gate 61–64 and other AND-gates are of the type wherein an AND-gate transmits or furnishes a high level signal on its output lead if and only if concurrent high level signals are present on its input leads. When any one signal to an input lead of an AND-gate is low level the otuput lead of the AND-gate transmits a low level signal.

During each above mentioned time interval a high level electrical timing signal TS3 is furnished from a timing signal generator 80 to one input of each of the AND-gates 61–64. The other input lead of each AND-gate 61–64 is connected with the output lead of an associated amplifier 51–54. Each AND-gate 61–64 responds during the time interval of the high level TS3 signal to an amplified document absence signal of its associated sensor 31–34 by furnishing or transmitting a high level signal from its output lead.

A series of bistable multivibrators 71–74 typically known as flip-flops record and store the high level signal responses of the AND-gates 61–64. There is one flip-flop 71–74 associated with a respective AND-gate 61–64. Each flip-flop has two stable states typically known as a reset state and a set state. The signals on the output leads of each AND-gate 61–64 are furnished directly to one of the input leads of an associated flip-flop 71–74 known as the set or S input lead. When a flip-flop is initially in its reset state, it will be placed in its set state when a high level signal is furnished on its S input lead and will remain in its set state regardless of the level of signals subsequently furnished on its S input lead until such time that a high level signal is furnished on its reset or R input lead. Thus upon the first occurence of a document absence signal response by a sensor 31–34 during the time interval of the high level TS3 signal the associated flip-flop 71–74 is placed in its set state and remains in that state regardless of whether or not another document 11*b* moves forward and intercepts the associated light beam.

Each flip-flop 71–74 is shown as having two output leads commonly known as the "1" output lead and the "0" output lead. In this invention only the "0" output lead is needed and used. As long as a flip-flop is in its reset state the signal furnished on its associated "0" output lead is high level. Conversely, as long as a flip-flop is in its set state the signal on its "0" output lead is low level.

There is provided a memory interrogator 90 whose function is to periodically interrogate or sample the memory 60 to determine if there are any flip-flops 71–74 of memory 60 in the reset state. In other words, the memory interrogator 90 periodically interrogates the memory 60 to determine if the memory 60 lacks a recording or storage of a document absence signal response of any of the sensors 31–34. This function is accomplished by providing a mutually inclusive OR-gate 91. A mutually inclusive OR-gate responds to one or more of its input leads having thereon a particular voltage level. The "0" output lead of each flip-flop 71–74 is connected to an input lead of OR-gate 91. The OR-gate 91 responds and transmits a high level signal on its output lead only if any one or more of the signals on its input leads are high level. In the event that none of the signals furnished on the "0" output leads of the flip-flops 71–74 are high level, OR-gate 91 responds by transmitting a low level signal on its output lead. Thus when a high level signal is transmitted on the output lead of OR-gate 91 it is indicative of the fact that one or more of the flip-flops 71–74 are in their reset state.

Since the present invention is concerned with determining whether or not a document 11*b* has been halted or is present adjacent any one sensor 31–34 during a complete time interval a means is provided for sampling the response of OR-gate 91 immediately after each time interval has occurred. This is accomplished by providing an AND-gate 92 having two input leads thereof. The output lead of OR-gate 91 is connected with one input lead of AND-gate 92. A high level timing pulse TS4 furnished from the timing signal generator 80 is supplied to the other input lead of AND-gate 92 subsequent to each time interval. Thus, if at the time the high level TS4 pulse is furnished to AND-gate 92, OR-gate 91 is also furnishing a high level signal to AND-gate 92, the AND-gate 92 responds and transmits a high level pulse on its output lead.

Figure 2:
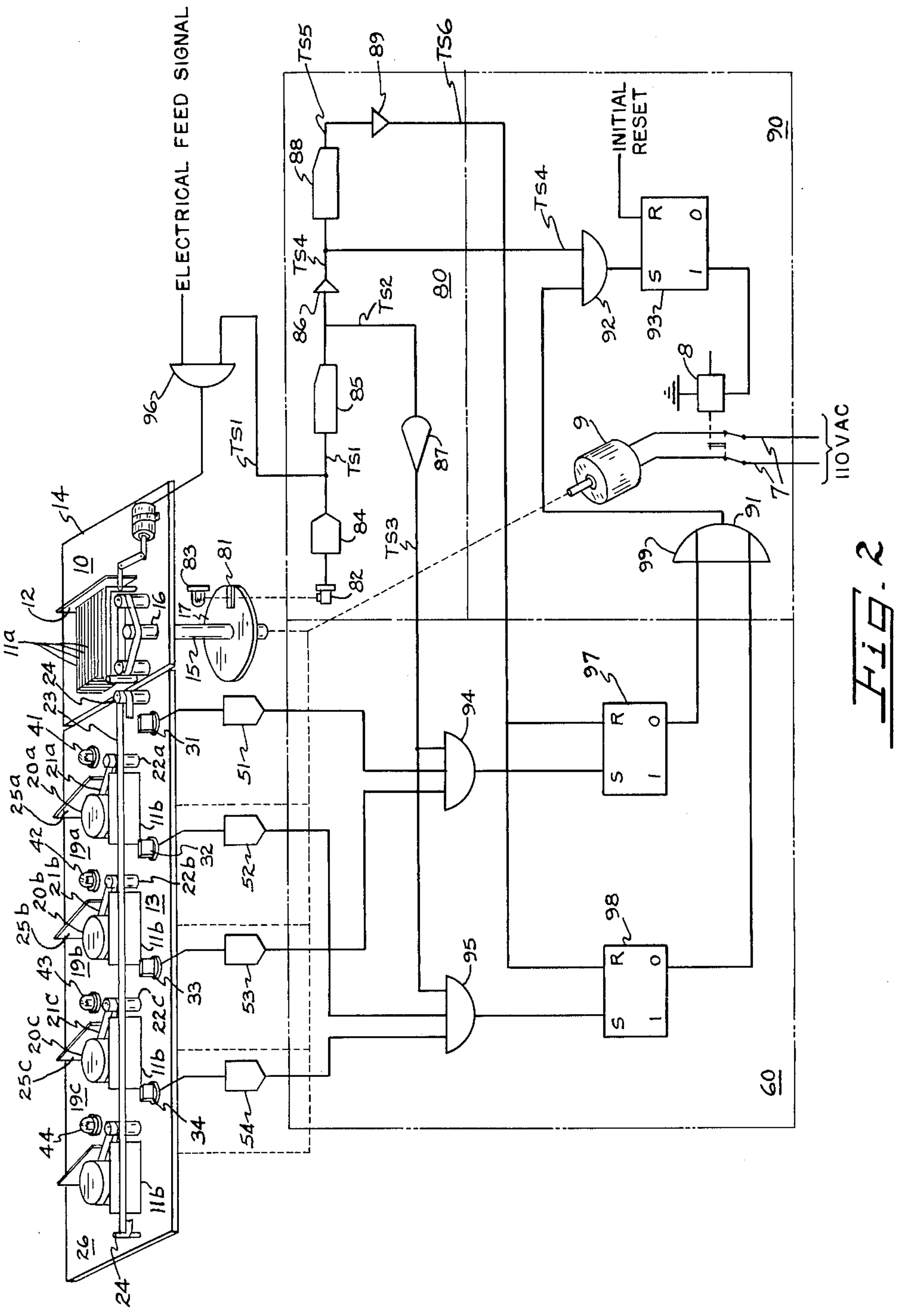
FIGURE 2 is a combined diagrammatic illustration of an environment of the present invention and a logic diagram showing a second embodiment of the present invention.

The high level pulse transmitted on the output lead of AND-gate 92 may be used to operate any suitable device for removing motive power from the transporting apparatus 13. As shown in FIGS. 1 and 2 and as more typically used, the output lead of AND-gate 92 is connected with the S input lead of a flip-flop 93. The high level pulse on the S input lead causes flip-flop 93 to be placed in its set state. Thus a high level signal is transmitted from the "1" output lead of the flip-flop 93. The "1" output lead of flip-flop 93 is connected with one terminal of a normally unenergized relay 8. The other terminal of the relay is connected to a suitable electrical power supply compatible with the voltage of the high level signal furnished to the first terminal. The relay is thus energized and opens normally closed contacts 7 thereby removing electrical power from the electrical motor 9. The motor ceases to provide power to the transporting apparatus 13 and feeding device 10. Thus movement of all documents 11*b* in the path of travel is ceased. The halted document may then be removed from the transporting apparatus and action may be taken to determine what caused the halting of the particular document.

Flip-flop 93 may be returned to its reset state at the time the entire system is once again placed in operation by a signal shown in the figure as initial reset, which is usually provided in start up procedures for the entire system.

When flip-flop 93 is reset the signal from its "1" output terminal changes to low level. The relay is thus de-energized and the contacts 7 close thereby applying electrical power to the motor 9 in order that documents may once again be transported in the path of travel defined by belt 23.

There may be additionally provided a means operated by the high level signal from the "1" output lead of flip-flop 93 for actively urging the belt 23 away from the belts 21*a*, 21*b*, and 21*c* at the time power is removed from the motor 9.

A timing signal generator 80 provides a means for rendering the memory 60 responsive only during certain time intervals and for rendering the memory interrogator 90 responsive subsequent to each time interval. Additionally the signal generator 80 is provided for clearing the memory 60 of all recordings of document absence signals in anticipation of the next time interval. The signal generator 80 provides a set of properly time synchronized electrical control signals. The timing wheel 17, which is rotated at a constant angular speed, has provided near its periphery a slot 81. On one side of the wheel 17 is positioned a photo responsive sensor 82 and on the other side of the wheel opposite sensor 82 is an energized light source 83. As wheel 17 rotates, slot 81 periodically passes light from source 83 to sensor 82. Thus for a short period of time during the rotation cycle of wheel 17, sensor 82 furnishes a small voltage to an associated sensor amplifier 84. The amplifier 84 furnishes a high level signal or pulse TS1 to the input lead of a one-shot multivibrator 85 plus one input lead of a two input AND-gate 96.

As long as AND-gate 96 is enabled by a high level electrical feed signal (from an external source) at its other input lead a series of high level pulses will be supplied from its output lead to feeding device 10 at regular recurring instants of time. Any other suitable means for supplying a series of regular recurring electrical signals to the feeding device 10 may be utilized. For example AND-gate 96 may be eliminated and pulses may be supplied to the feeding device 10 directly from an electronic data processor. It is not necessary to the present invention that the series or set of timing signals herein described and including TS1 be in synchronism with operation of the feeding device 10 nor in synchronism with the movement of documents 11*b* in the transporting apparatus 13. It is however, important to the present invention that a predetermined time relationship with reference to the high level signal TS1 be established between the timing signals herein described.

A change in signal level from low level to high level at the input lead of a one-shot multivibrator initiates or triggers the one-shot to thereby cause it to transmit from its output a low level signal of predetermined time duration. The high level TS1 pulse triggers one-shot 85. As represented in FIG. 3 a low level TS2 signal is transmitted from the output lead of one-shot 85 for a time duration of approximately 90 milliseconds. This time duration may be adjusted to any value according to the specific needs of a specific embodiment. The time duration of the low level TS2 signal is established to be at least greater than the time required for a normally moving document 11*b* to move completely past any one sensor 31–34. In the embodiment of the present invention herein described and illustrated the time duration of the low level TS2 signal is established as at least greater than the time required for two successively fed documents moving normally in the path of travel to completely pass any one sensor 31–34. At approximately the midpoint of the time duration of the low level TS2 signal another high level TS1 pulse occurs and is furnished to the input lead of one-shot 85. A second occurence of the high level TS1 pulse has no effect on one-shot 85 at that time. Only if the one-shot 85 is in its stable state, i.e., furnishing a high level signal on its output lead, will a high level TS1 signal at its input lead have any effect on the one-shot 85.

The low level TS2 signal is furnished to the input leads of a differentiator 86 and an inverter 87. Inverter 87 changes or inverts the low level TS2 signal to a high level TS3 signal at its output lead. The high level TS3 signal available from the output lead of inverter 87 is furnished to an input lead of each AND-gate 61–64 of memory 60.

Thus, as long as the TS3 signal is high level the memory 60 is in a condition responsive to the document absence signal response of each sensor 31–34. When one-shot 85 returns to its stable state (at the end of the 90 milliseconds time duration) the signal on its output lead changes to a high level TS2 signal. The high level TS2 signal is inverted by inverter 87 to a low level TS3 signal. As long as the TS3 signal is low level each of the AND-gates 61–64 are disabled. The memory 60 is thus rendered non-responsive to document absence signal responses of the sensors 31–34 during a short time interval occuring between high level TS3 signals. The short time interval occuring between high level TS3 signals is, in the illustrated and described embodiments, the time between the end of the 90 millisecond high level TS3 signal and the next occurence of a high level TS1 signal (which is also the beginning of the next occurence of a high level TS3 signal). This short time interval is not a fixed interval of time but is merely dependant upon the time between the end of a high level TS3 signal and when the one-shot 85 is again triggered.

When the signal TS2 on the output lead of one-shot 85 changes from low level to high level differentiator 86 responds thereto and transmits a high level TS4 pulse or signal on its output lead to the input lead of a second one-shot 88 and one input lead of a two input lead AND-gate 92. AND-gate 92 will respond to the high level TS4 pulse and transmit a signal on its output lead according to the level of the signal on its other input lead available from the output lead of OR-gate 91. Thus, as the high level TS4 pulse occurs the memory 60 is interrogated to determine if it lacks a recording and storage of a document absence signal responsive of one or more sensors. If the memory 60 lacks a recording of a document absence signal response of one or more sensor, one or more of the flip-flops 71–74 are in their reset state thereby causing OR-gate 91 to be transmitting a high level signal to an input lead of AND-gate 92.

The high level TS4 pulse, in addition, triggers one-shot 88 which in turn transmits a low level signal TS5 for a short time duration from its output lead. The time duration of the low level TS5 signal is shown in FIG. 3 as approximately 600 microseconds. The low level TS5 signal is furnished to the input lead of a second differentiator 89. The differentiator 89 thus transmits a high level TS6 pulse on its output lead. Thus, the occurence of a high level TS4 signal is followed 600 microseconds later by a high level TS6 pulse. The high level TS6 pulse is furnished to the reset or R input leads of all flip-flops 71–74 of the memory 60. Each flip-flop 71-74 responds to the high level TS6 pulse by being placed in their reset state. The memory 60 is thus cleared of all previous document absence signal recordings.

Any other suitable means for generating a set of mutually time related timing signals TS3, TS4 and TS6 may be used. In the present invention there is no requirement that the set of timing signals be synchronized with operation of the feeding device 10 nor movement of documents **11*b* in the transporting apparatus 13**.

As shown in FIG. 3 a voltage pattern for the output of any one of the amplifiers 51–54 is shown along with various responses possible by other components of the present invention. There is shown in FIG. 3*a* in the upper left-hand corner a high level TS1 pulse. In response to the high level TS1 pulse a high level TS3 signal is generated. At the beginning of the high level TS3 signal normally moving documents **11*b* in the document transporting apparatus 13 are located such that no document intercepts any light beam. Thus all amplifiers 51–54 are caused to furnish high level document absence signals to their associated AND-gates 61–64. Each AND-gate 61–64 thus transmits a high level signal to its associated flip-flop 71–74 of memory 60. Each flip-flop 71–74 of the memory is thus placed in its set state at the beginning of the high level TS3 signal. The memory 60 has recorded the fact that an absence of a document from adjacent each sensor 31–34 has been sensed by each sensor 31–34**.

In the example of the present invention shown and described, each properly located moving document **11*b* intercepts a light beam approximately 18 milliseconds after the occurence of the high level TS1 pulse. Each sensor 31–34 thus causes its associated amplifier 51–54 to furnish a low level signal to its associated AND-gate 61–64. The output of each AND-gate 61–64 thus changes to low level. The change in voltage level at the S input leads of the flip-flops 71–74** has no effect on the flip-flops.

In this illustration of properly located and normally moving documents all of the flip-flops 71–74 are placed in their set state at the same instant of time. The "0" output leads of all flip-flops 71–74 thus furnish low level signals to all of the input leads of OR-gate 91. The output lead of OR-gate 91 accordingly furnishes a low level signal to the one input lead of AND-gate 92.

When a document **11*b* passes away from a sensor 31–34 it ceases to intercept the light beam associated with that sensor and the sensor again causes the associated amplifier 51–54 to furnish a high level signal to its associated AND-gate 61–64. Since the TS3 signal is still high level the output of the associated AND-gate 61–64 will at this time change from low level to high level. Since all flip-flops 71–74** are already in their set state there is no change in the state of the flip-flop; it remains in its set state.

Approximately 18 milliseconds after occurence of the next succeeding high level TS1 pulse each document **11*b* has moved and advanced in the transporting path so that it intercepts the light beam associated with the next succeeding sensor 31–34. A low level signal is once again furnished on each S input lead of each flip-flop 71–74. Flip-flops 71–74 do not change state at this time; they remain in the set state. At the end of the 90 millisecond time duration the TS2 signal changes from low level to high level. Also at this time the TS3 signal changes from high level to low level thereby disabling each of the AND-gates 61–64**.

A high level TS4 pulse is now furnished to one input lead of AND-gate 92 for interrogation of the memory 60. Since all the flip-flops 71–74 are in their set state, OR-gate 91 furnishes a low level signal to the other input lead of AND-gate 92. There is thus no effect on the output lead of AND-gate 92. When there is no effect or response on the output lead of AND-gate 92 it has been determined that each flip-flop 71–74 of the memory 60 has recorded a document absence signal response of each sensor 31–34 during the preceding time duration of the high level TS3 signal. Action identical to that described takes place again and again when properly located documents **11*b* are normally moving through the transporting apparatus 11**.

There is, as was previously mentioned, no requirement that there be any synchronism or relationship between the location of the documents **11*b*** with respect to initiation of the set of the timing signals TS3, TS4, and TS6. This is illustrated in FIG. 3*a* wherein it is shown in the output voltage pattern of an amplifier 51–54 that a document begins intercepting the light beam associated with a sensor 31–34 just prior to generation of the high level TS3 signal; the document may be said to be mislocated with respect to where it should normally be at the particular instant it intercepts the light beam. When a document is thus mislocated adjacent a sensor 31–34, a low level signal is being furnished to that sensor's associated AND-gate 61–64 at the time the TS3 signal becomes high level. At the time the mislocated document **11*b* no longer intercepts the light beam, i.e., the mislocated document moves past the sensor 31–34, the associated AND-gate 61–64 will then respond and transmit a high level signal to the S input lead of its associated flip-flop 71–74 and thereby cause that flip-flop to be placed in its set state. Action as described previously again takes place. No response is generated at the output lead of AND-gate 92 when the memory 60** is interrogated by the high level TS4 signal.

There has been described and illustrated that the present invention does not generate a high level signal at the output lead of AND-gate 92 so long as space between documents or sensing of the absence of documents occurs at each sensor any time during the time duration of the high level TS3 signal.

As shown in FIG. 3*b* in the output voltage pattern for an amplifier 51–54 a Document #1 normally moving and properly positioned in the document transferring apparatus 13 has juxtaposed against its trailing edge a moving Document #2. Thus, there is no space separating Document #1 from Document #2. It is to be recalled that a flip-flop 71–74 associated with a sensor 31–34 first encountered by Document #1 is placed in its set state at the beginning of the occurrence of the high level TS3 signal. Alternatively, it is even possible to have Document #1 mislocated as was previously illustrated and described and have Document #2 juxtaposed against Document #1 and still the flip-flop 71–74 associated with the sensor 31–34 first encountered will be placed in its set state when the lagging edge of Document #2 passes away from that sensor. Thus it is once again shown that the flip-flop 71–74 associated with a sensor 31–34 is placed in its set state the first time the absence of a document is sensed by the sensor regardless of the mislocation of actually moving documents past that sensor.

While it has been previously mentioned that the sensors 31–34 need not be spaced apart from each other by any particular distance they are normally positioned such that when a document 11$b$ abnormally halts or becomes jammed it does so adjacent a document sensor 31–34. The halted document will thereafter continuously intercept the beam of light associated with the sensor. The associated flip-flop 71–74 will not be placed in its set state at any time during the next time duration of the high level TS3 signal, as shown in FIG. 3$c$, since the associated AND-gate 61–64 will have on one of its input leads a continuous low level signal from the output lead of the associated amplifier 51–54.

As long as a flip-flop 71–74 of the memory 60 is in its reset state a high level signal from the "0" output lead of the flip-flop is furnished to one input lead of OR-gate 91. OR-gate 91 responds to a high level signal by transmitting a high level signal from its output lead to one input lead of AND-gate 92. When the high level TS4 pulse is furnished to the other input lead of AND-gate 92 a high level pulse is transmitted on the output lead of AND-gate 92 to cause flip-flop 93 to be placed in its set state. The signal then available from the "1" output lead of flip-flop 93 then causes motive power to be removed from the document transporting apparatus 13 as described previously.

There has been shown and described a system for determining if any one of a plurality of document sensors 31–34 has sensed the absence of a document at any time during an interval of time. The interval of time (duration of the high level TS3 signal) may be adjusted as required or desired to distinguish between an actually halted document and a multiplicity of juxtaposed documents. Thus the time duration of the TS3 high level signal determines the number of juxtaposed documents actually moving in the transporting apparatus that will be distinguished from an actually halted document. If a series of juxtaposed documents continuously intercepts a light beam during an entire time duration of the high level TS3 signal thereby evidencing a series defect in the feeding device 10 or transporting apparatus 13 the present invention will treat this as a halted document adjacent the associated photocell.

In FIG. 2 there is shown the logic diagram of a second embodiment of the present invention. In this figure it is shown that the memory 60 includes only two flip-flops 97 and 98. The S input lead of flip-flop 97 is connected with the output lead of an associated multiple input AND-gate 94. The S input lead of flip-flop 98 is connected with the output lead of an associated multiple input AND-gate 95. The high level TS3 signal is supplied to an input lead of AND-gate 94 and 95 as described in the first embodiment. However, the other input leads to each AND-gate 94 and 95 are supplied with signals from the output leads of groups of the amplifiers 51–54. The output leads of alternate amplifiers 51 and 53 are connected with the input leads of the right-hand AND-gate 94. The output leads of the other alternate amplifiers 52 and 54 are connected to the input leads of the left-hand AND-gate 95. The sensors 31 and 33 may thus be said to be interstitially positioned with sensors 32 and 34.

The high level signal on the output lead of an AND-gate 94 or 95 corresponds to the concurrent occurrence of a TS3 signal and the high level output signal of each amplifier connected thereto.

Since each AND-gate 94 and 95 is required to detect the concurrent high level output signals on their associated set of amplifiers output leads it is necessary that the set of sensors associated with an AND-gate 94 or 95 be spaced apart at regular intervals along the transporting path. If the sensors of a set are not spaced apart at regular intervals there may be provided any suitable means for delaying the signal furnished from the amplifiers such that normally moving documents 11$b$ passing through the transporting apparatus 13 cause signals to arrive at the input leads of an AND-gate at the same instant in time even though different documents intercept different light beams at different instants of time.

Any one document 11$b$ actually halted in front of a sensor 31–34 causes that sensor's associated amplifier 51–54 to maintain a low level signal on its associated AND-gate 94 or 95 input lead during the entire time duration of high level TS3 signal; the AND-gate's associated memory flip-flop 97 or 98 will not be set. Action as described for the first embodiment will take place to set flip-flop 93 in order to cause disconnection of motive power from the transporting apparatus 13.

The timing signal generator 80 of the second embodiment may be a duplicate of that shown and described for the first embodiment or it may be any suitable means for providing a series of properly time related timing signals. Again as in the first embodiment it is not necessary that a set of timing signals TS3, TS4 and TS6 be initiated at any particular time with respect to location of moving documents 11$b$ in the transferring apparatus 13.

In FIG. 3 there is illustrated an output voltage pattern from the output lead of one of the AND-gates 94 or 95 of the second embodiment. The transition in voltage level on the output lead of an AND-gate (94 or 95) is a signal representing the fact that each and every sensor associated with that AND-gate (94 or 95) is illuminated by a light beam thereon (transition to high level) or one or more of the associated sensors have begun to have their associated light beam intercepted (transition to low level). If for instance a document 11$b$ begins to intercept the light beam of sensor 31 just slightly prior to the time that a document 11$b$ begins to intercept the light beam of sensor 33, the output of AND-gate 94 begins to be low level at the instant the light beam of sensor 31 is intercepted. If the trailing edge of a document 11$b$ passes away from sensor 31 some time prior to the time that the trailing edge of a document 11$b$ passes away from the sensor 33 the output of AND-gate 94 does not change to high level until the trailing edge of a document 11$b$ pasess away from the sensor 33. Thus each AND-gate 94 and 95 will transmit a high level signal on its output lead if and only if all light beams associated with that AND-gate are not being intercepted. The memory flip-flop associated with an AND-gate 94 or 95 will remain in its reset state if any one light beam is continuously intercepted for the complete time duration of the high level TS3 signal regardless of whether or not other light beams associated with that flip-flop nonetheless illuminate their associated sensor during the TS3 time interval.

Interrogation of the memory 60 takes place in a manner identical to that described for the first embodiment. OR-gate 99 of the second embodiment (FIG. 2) is equivalent in all respects to OR-gate 91 of the first embodiment (FIG. 1). However since there are only two flip-flops 94 and 95 of the memory 60, the OR-gate 99 is provided with only two input leads which are connected with the "0" output leads of the flip-flops.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. In a system for moving spaced apart objects in a path of travel, means for determining that an object has remained at a point in said path of travel for a specified period of time, said means comprising: a sensor, responsive to the presence and absence of an object at said point, capable of providing a first signal denoting the absence of an object at said point; a memory coupled to said sensor and responsive during a specified time interval for recording said first signal; said memory furnishing a data signal when said first signal is not recorded therein; a memory interrogating means coupled to said memory and responsive to said data signal at a time subsequent to said time interval for providing a second signal, said second signal denoting that an object has remained at said point during said time interval.

2. In a system for moving spaced apart objects in a path of travel, means for determining that an object has remained at a point in said path of travel for a specified time interval, said means comprising: a sensor, responsive to the presence and absence of an object at said point, capable of providing a first signal denoting the absence of an object at said point; a memory normally furnishing a data signal, said memory coupled to said sensor and responsive during said time interval to said first signal for eliminating said data signal; a memory interrogating means coupled to said memory and responsive to said data signal at a time subsequent to said interval for transmitting a second signal, said second signal denoting that an object has remained at said point throughout said time interval.

3. In a system for moving spaced apart objects in a path of travel, means for determining that an object has remained at a point in said path of travel for a specified time interval, said means comprising: an object sensor positioned adjacent said point, said sensor responsive to the presence and absence of an object at said point and being capable of providing a first signal denoting absence of an object at said point; a memory coupled to said object sensor and responsive during recurring ones of said time intervals for storing said first signal, said memory furnishing a second signal as long as said first signal is not stored therein; a memory interrogating means coupled to said memory and responsive to said second signal at a time subsequent to each of said recurring time intervals for transmitting a third signal, said third signal denoting that an object has remained at said point in said path of travel throughout one of said recurring time intervals.

4. In a system for moving spaced apart objects in a path of travel, means for determining that an object has remained at any of a plurality of points in said path of travel throughout a specified time interval, said means comprising: a plurality of spaced apart object sensors positioned adjacent said path of travel, one of said sensors being located at each of said points each of said sensors being responsive to the presence and absence of an object adjacent thereto and capable of transmitting a respective first signal when an object is absent from that object sensor; a memory coupled to said plurality of object sensors and normally transmitting a plurality of data signals, respective ones of said data signals associated with respective ones of said object sensors, said memory responsive to said first signals during recurring time intervals for removing respective ones of said data signals; a memory interrogating means coupled to said memory and responsive to at least one of said data signals at times subsequent to each of said time intervals for generating a second signal, said second signal denoting that an object has remained adjacent one of said sensors throughout one of said recurring time intervals.

5. In a system for moving spaced apart objects in a path of travel, means for determining that an object has remained at point in said path of travel for a specified period of time, said means comprising: a plurality of object sensors, each having a designated sensing area, positioned at a plurality of points adjacent said path of travel, respective ones of said sensors being responsive to the absence of an object, within its respective sensing area, for transmitting a respective first signal; a storage means coupled to said object sensors and normally transmitting a second signal, said storage means responsive to the occurrence of all of said first signals during recurring time intervals for ceasing transmission of said second signal, a storage interrogating means coupled to said storage means and responsive to said second signal at times subsequent to each of said time intervals for transmitting a third signal, said third signal denoting that an object has remained at a point in said path of travel adjacent one of said sensors during said specified time interval.

6. In a system for moving spaced apart objects in a path of travel, a means for determining that an object has halted in said path of travel, said means comprising: a plurality of spaced apart object sensors positioned adjacent said path of travel, respective ones of said sensors adapted for transmitting an object absence signal only when an object is absent from adjacent the respective sensor; a timing signal generator for furnishing a recurring time signal, said time signal being present for a fixed time duration; a plurality of storage means each normally transmitting a data signal, respective ones of said storage means coupled to at least one of said object sensors and coupled to said signal generator, respective ones of said storage means being responsive to the concurrence of said time signal and said object absence signals transmitted from the object sensors coupled thereto for ceasing the transmitting of its respective data signal; a storage interrogating means, for transmitting a halted document signal, coupled to said plurality of storage means and responsive to the transmission of a data signal from any of said storage means at times subsequent to each of said time signals.

7. In a system for moving spaced apart objects at a substantially constant speed in a path of travel, a means for determining that an object has halted in said path of travel, said means comprising: a plurality of spaced apart object sensors positioned at a plurality of respective points adjacent said path of travel, each of said sensors generating a first signal in response to the absence of an object from adjacent the respective sensor; a signal means for generating a time signal of predetermined time duration at recurring time intervals, said time duration being greater than time required for complete movement of one of said objects past any one of said points; a plurality of gate means each connected to at least one of said sensors, each gate means responsive to the concurrence of said time signal and all first signals generated by the said sensors connected thereto for generating a respective second signal; a memory connected to said plurality of gate means for storing said second signals and for furnishing a data signal; a memory interrogating means connected to said memory and responsive to said data signal at times subsequent to said time signals for generating a third signal when said data signal indicates that less than all of said gate means have caused respective second signals to be stored in said memory, said third signal denoting that an object has halted in said path of travel.

8. In a system for moving spaced apart objects in a path of travel past a plurality of spaced apart points adjacent said path of travel, a means for determining that an object has halted adjacent one of said points, said means comprising: a plurality of object sensors, respective ones of said sensors positioned at respective ones of said points, respective sensors generating a respective first signal when an object is absent from adjacent the respective point, said plurality of sensors being grouped into a first group of sensors and a second group of sensors; a first means coupled to said first group of sensors and responsive during recurring time intervals to the concurrence of first signals from all sensors of said first group of sensors for generating a second signal, a second means coupled to said second group of sensors and responsive during said time intervals to the concurrence of first signals from all sensors of said second group of sensors for generating a third signal, a memory connected to said first means and connected to said second means for storing said second signal and for storing said third signal, said memory furnishing data signals, said data signals denoting which of said second signal and said third signal are stored therein; a memory interrogating means connected to said memory and responsive to said data signals at instants in time subsequent to said time intervals for generating a fourth signal when said memory is storing less than both said second signal and said third signal.

9. In a system for moving spaced apart objects in a path of travel, a means for determining that an object has halted in said path of travel, comprising: a plurality of object sensors positioned at a plurality of spaced apart points adjacent said path of travel, each sensor responsive to the absence of an object in said path of travel adjacent said sensor for transmitting a respective first signal, a signal means for generating a timing signal for predetermined time duration at intervals and for generating a timing pulse occurring subsequent to said timing signal; a plurality of gate means, each gate means coupled to at least one of said sensors, each gate means responsive to the concurrence of said timing signal and first signals associated with said sensors coupled thereto for generating a respective second signal; a plurality of storage means equal in number to the plurality of gate means, each storage means coupled to a respective gate means for storing a respective second signal; each storage means adapted to furnish a respective data signal when a respective second signal is stored therein; a second gate means coupled to said storage means and responsive to the concurrence of said timing pulse and less than all of said data signals for generating a halting signal, said halting signal denoting that an object has been halted in said path of travel adjacent an object sensor for the entire period of one of said predetermined time durations.

10. In a system for moving spaced apart objects in a path of travel, a means for determining that an object has halted in said path of travel, said means comprising: a plurality of groups of object sensors, each of said groups having as a member at least one object sensor, said object sensors being positioned at spaced apart points adjacent said path of travel, each sensor responding to the absence of an object in said path of travel from adjacent said sensor's respective point by transmitting a first signal; a first signal means for generating a timing signal of fixed time duration at intervals; a plurality of AND-gates equal in number to said plurality of groups of object sensors, each one of said AND-gates being responsive to the concurrence of all first signals from one of said groups of object sensors and said timing signal for transmitting a respective second signal; a plurality of storage means equal in number to the said plurality of AND-gates, each one of said storage means responsive to a second signal from a respective one of said AND-gates for transmission of a data signal; an OR-gate responsive to the lack of a data signal from any of said storage means for transmitting a third signal; second signal means for generating a time pulse subsequent to said timing signal; and AND-gate responsive to said third signal and said time pulse for generating a fourth signal, said fourth signal denoting that an object has halted adjacent one of said sensors; third signal means for generating a clearing signal at a time subsequent to said time pulse and prior to a succeeding timing signal; each of said storage means responsive to said clearing signal for ceasing transmission of the respective storage means data signal.

11. In a system for transferring objects from a path of travel into a plurality of receiving compartments, a driving means normally operative for moving a plurality of said objects spaced apart from each other in said path of travel past said receiving compartments; a plurality of spaced apart object sensors, each having a designated sensing area, positioned adjacent said path of travel, each object sensor furnishing a respective first signal when an object is absent its designated sensing area; a memory means normally furnishing second signals, respective ones of said second signals corresponding to respective ones of said sensors; said memory means coupled to said sensors and responsive during recurring time intervals to said first signals for eliminating respective second signals; a memory interrogating means coupled to said memory means and responsive to any of said second signals at times subsequent to each of said time intervals for generating a third signal; a drive halting means coupled to said interrogating means and responsive to said third signal for rendering said driving means nonoperative.

12. In a system wherein a plurality of objects are moved in a path of travel past a point adjacent said path of travel: driven moving means for moving said plurality of objects in spaced apart relationship with each other past said point; a motive power means, a control means normally connecting said motive power means with a source of energizing power; said motive power means coupled with said moving means and normally driving said moving means when said control means is connected with said source of energizing power; an object sensor positioned at said point, said object sensor adapted to respond to the absence of an object in an area adjacent said point by furnishing a first signal; a storage means coupled with said sensor and normally transmitting a second signal, said storage means responsive to said first signal during recurring time intervals for eliminating said second signal; a storage interrogating means coupled to said storage means and responsive to said second signal at times subsequent to said time intervals for generating a third signal, said control means coupled to said storage interrogating means and responsive to said third signal for disconnecting said motive power means from said source of energizing power.

References Cited by the Examiner

UNITED STATES PATENTS

| | | | |
|---|---|---|---|
| 2,963,293 | 12/60 | Klein | 221—57 |
| 2,973,202 | 2/61 | Schmeck et al. | 221—57 |
| 2,996,630 | 8/61 | Bensema et al. | 340—259 X |
| 3,114,902 | 12/63 | Tanguy | 340—259 |

M. HENSON WOOD, Jr., *Primary Examiner.*

ROBERT B. REEVES, *Examiner.*